(12) United States Patent
Li et al.

(10) Patent No.: US 12,579,777 B2
(45) Date of Patent: Mar. 17, 2026

(54) WIRELESS CAMERA STREAMING WITH TEMPLATE MATCHING

(71) Applicant: GM Global Technology Operations LLC, Detroit, MI (US)

(72) Inventors: Chuan Li, Troy, MI (US); Fan Bai, Ann Arbor, MI (US); Sushama K. Mithapally, Northville, MI (US); Andrew W. Averhart, Redford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 588 days.

(21) Appl. No.: 18/150,387

(22) Filed: Jan. 5, 2023

(65) Prior Publication Data

US 2024/0233320 A1      Jul. 11, 2024

(51) Int. Cl.
G06V 10/75          (2022.01)
H04N 19/146        (2014.01)
H04N 19/517        (2014.01)

(52) U.S. Cl.
CPC ......... G06V 10/751 (2022.01); H04N 19/146 (2014.11); H04N 19/517 (2014.11)

(58) Field of Classification Search
CPC .. G06V 10/751; H04N 19/146; H04N 19/517; H04N 21/44008; H04N 21/4402
See application file for complete search history.

(56) References Cited

U.S. PATENT DOCUMENTS

| | | | |
|---|---|---|---|
| 2018/0068448 A1* | 3/2018 | Rastgar | G06T 7/73 |
| 2019/0087684 A1* | 3/2019 | Gao | G06V 30/2504 |
| 2022/0180633 A1* | 6/2022 | Xu | G06V 10/225 |
| 2023/0319250 A1* | 10/2023 | Bove, Jr. | H04N 19/167 |
| | | | 348/43 |
| 2024/0157959 A1* | 5/2024 | Jung | B60W 50/14 |

* cited by examiner

*Primary Examiner* — Han Hoang
(74) *Attorney, Agent, or Firm* — Vivacqua Crane, PLLC

(57)          ABSTRACT

A method for video streaming includes receiving an input image from a camera. The input image includes a plurality of input grid areas. The method further includes receiving a template image. The method further includes comparing the matching error with a template-matching error threshold to determine whether the matching error is equal to or greater than the template-matching error threshold in order to identify unmatched grid areas of the input image. The plurality of input grid areas includes the unmatched grid areas and matched grid areas. The matching error of the matched grid areas is not equal to or greater than the template-matching error threshold. The method further includes transmitting the unmatched grid areas of the input image and identification information of the matched grid areas to the vehicle, thereby minimizing bandwidth consumption used during video streaming.

17 Claims, 5 Drawing Sheets

WIRELESS CAMERA STREAMING WITH TEMPLATE MATCHING

INTRODUCTION

The present disclosure relates to systems and methods for wi-fi camera streaming with template matching.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Wireless cameras sometimes stream video and audio to a display in a vehicle. The wi-fi bandwidth, however, is limited. Yet, in-vehicle applications demand for wi-fi bandwidth keeps increasing due, in part, to streaming applications, such as in-vehicle video conferencing applications. It is therefore desirable to develop a method and a system for maintaining high-quality video streaming services while minimizing bandwidth consumption.

SUMMARY

In an aspect of the present disclosure, the method for video streaming includes receiving an input image from a camera. The input image includes a plurality of input grid areas. The camera is in wireless communication with a vehicle. The method further includes receiving a template image. The template image includes a plurality of template grid areas. The method further includes template matching each of the plurality of input grid areas of the input image to each corresponding one of the plurality of template grid areas of the template image. The template matching may generate matching error for each of the plurality of input grid areas of the input image. The method further includes comparing the matching error with a template-matching error threshold to determine whether the matching error is equal to or greater than the template-matching error threshold in order to identify unmatched grid areas of the input image. The plurality of input grid areas includes the unmatched grid areas and matched grid areas. The matching error of the unmatched grid areas is equal to or greater than the template-matching error threshold. The matching error of the matched grid areas is not equal to or greater than the template-matching error threshold. The method further includes, in response to determining that the matching error is equal to or greater than the template-matching error threshold, transmitting the unmatched grid areas of the input image and identification information of the matched grid areas to the vehicle, thereby minimizing bandwidth consumption used during video streaming. The method described in this paragraph minimizes bandwidth consumption during video streaming.

In an aspect of the present disclosure, the method further includes comparing the matching error with a cache error threshold to determine whether the matching error is less than or equal to the cache error threshold, and in response to determining: (a) that the matching error is equal to or greater than the template-matching error threshold and (b) that the matching error is equal to or less than the cache error threshold, caching a target input grid area as part of the template image.

In an aspect of the present disclosure, the method further, in response to determining: (a) that the matching error is not equal to or greater than the template-matching error threshold and (b) that the matching error is not equal to or less than the cache error threshold, refraining from caching a target input grid area as part of the template image.

In an aspect of the present disclosure, the method further, in response to determining that the matching error is equal to or greater than the template-matching error threshold, executing a breath-first search (BFS) to identify a subsequent input grid area of the plurality of input grid areas of the input image to be template matched with a corresponding, subsequent template grid area of the plurality of template grid areas of the template image.

In an aspect of the present disclosure, the matching error of an adjacent-input grid area is weighted to distinguish between static scenes and dynamic scenes in the input image, and the adjacent-input grid area is directly adjacent to the target input grid area.

In an aspect of the present disclosure, the method further, in response to determining that the matching error is equal to or greater than the template-matching error threshold, extracting a motion vector generated by a video encoder to identify a subsequent input grid area of the plurality of input grid areas of the input image to be template matched with a corresponding, subsequent template grid area of the plurality of template grid areas of the template image.

In an aspect of the present disclosure, the method further encoding, by a hardware encoder of the camera, the unmatched grid areas of the input image, and the method further comprising showing a final image in a display of the vehicle solely using the unmatched grid areas of the input image wirelessly transmitted from a wireless camera and the matched grid areas of the template image retrieved from a tangible, non-transitory, machine-readable medium of the vehicle.

The present disclosure also describes a tangible, non-transitory, machine-readable medium, including machine-readable instructions, that when executed by a processor, cause the processor to execute the method described above.

The present disclosure also describes a system including a transmitter and a controller in communication with the transmitter. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
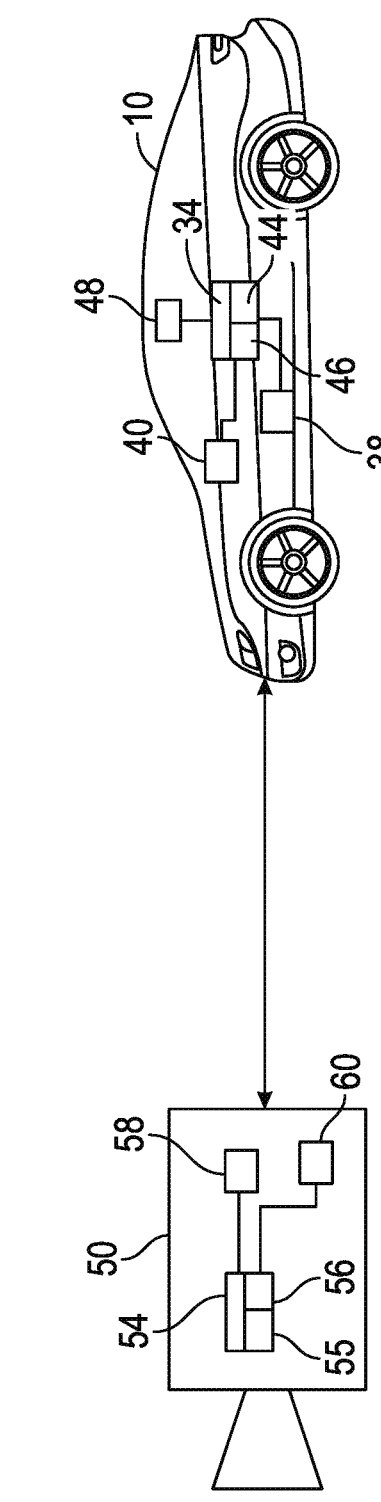
FIG. 1 is a schematic diagram of a system for video streaming.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a system 11 for video streaming includes a vehicle 10 and a wireless camera in communication with the vehicle 10. While the wireless camera 50 is shown outside the vehicle 10, it is contemplated that the wireless camera 50 may be inside of the vehicle 10. Regardless of its location, the wireless camera 50 is in wireless communication with the vehicle 10 through a network, such as the Internet, or using a short-range wireless technology, such as BLUETOOTH or Wi-Fi. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a vehicle controller 34, a receiver 40, and a display 48. The display 48 is in communication with the vehicle controller 34. The display 48 is configured to present images (e.g., video) and may include speakers to emit sound. The receiver 40 is in communication with the vehicle controller 34 and is configured to receive video data wirelessly from the wireless camera 50. The vehicle 10 may additionally include a video decoder 38 (e.g., a hardware-based video decoder) configured to convert base-band video signals to digital video. The video decoder 38 is in communication with the vehicle controller 34.

The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10.

The instructions may include one or more separate programs, each of which comprises an ordered listing of executable instructions for implementing logical functions. The instructions, when executed by the vehicle processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single vehicle controller 34 is shown in FIG. 1, the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the system 11.

The wireless camera 50 is in wireless communication with the vehicle 10 and includes a camera controller 54, a transmitter 58, and a video encoder 60. The transmitter 58 is configured to transmit video data to the vehicle 10 and is in communication with the camera controller 54. The video encoder 60 is in communication with the camera controller 54 and is configured to compress raw digital video to compressed digital video signals.

The camera controller 54 includes at least one camera processor 55 and a camera non-transitory computer readable storage device or media 56. The camera processor 55 may be a custom-made processor, a central processing unit (CPU), a graphics processing unit (GPU), an auxiliary processor among several processors associated with the camera controller 54, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the camera processor 55 is powered down. The camera computer-readable storage device or media 56 of the camera controller 54 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the camera controller 54 in controlling the wireless camera 50. The camera non-transitory computer readable storage device or media 56 includes machine-readable instructions (shown, for example, in FIGS. 2, 4, 5, and 6), that when executed by the one or more processors, cause the camera processors 55 to execute the method 100 (FIG. 2), the method 200 (FIG. 5), the method 300 (FIG. 6), and the method 400 (FIG. 7).

Figure 2:
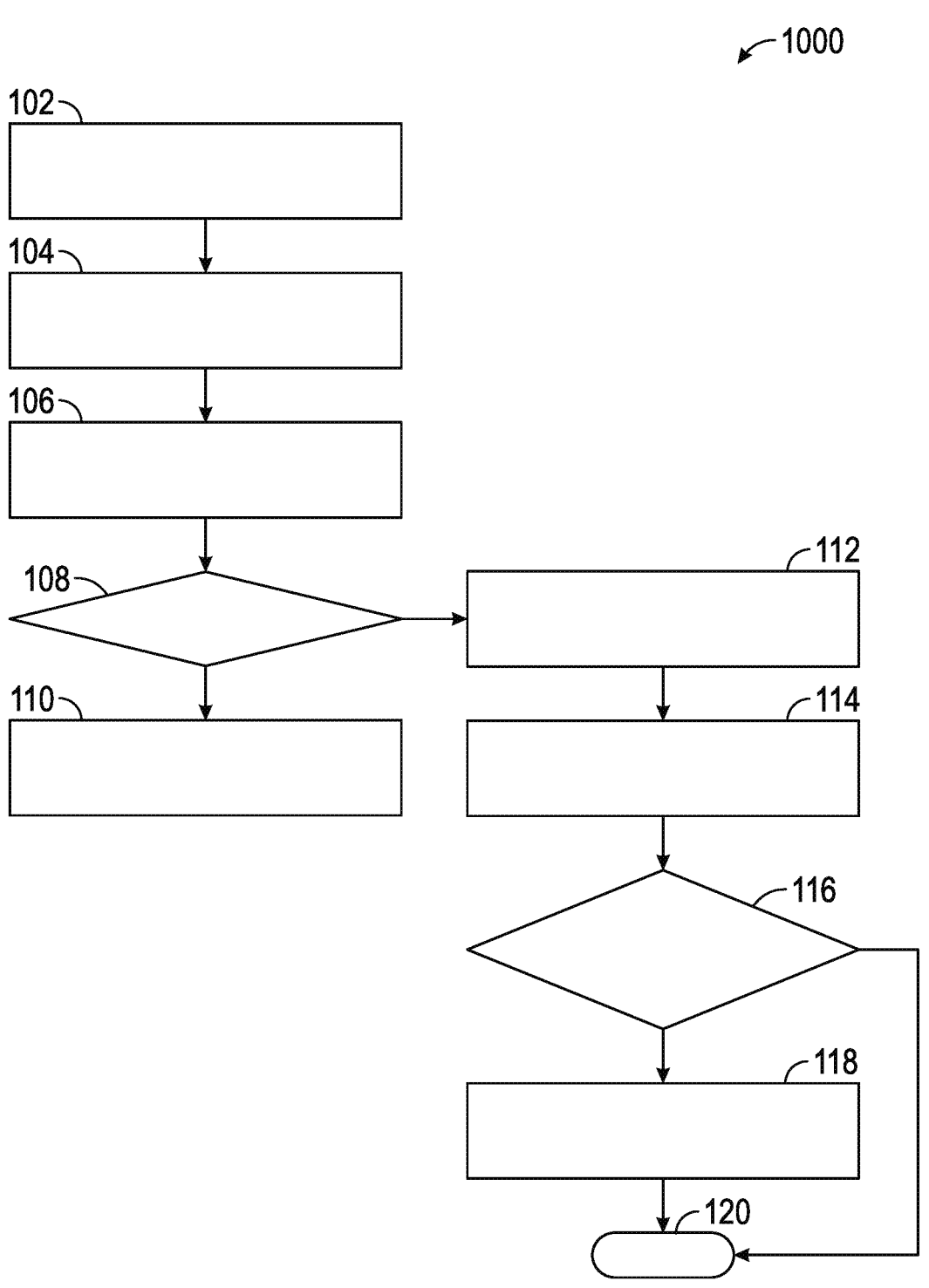
FIG. 2 is a flowchart of a method of region-based cache eviction.
Figures 3, 4:
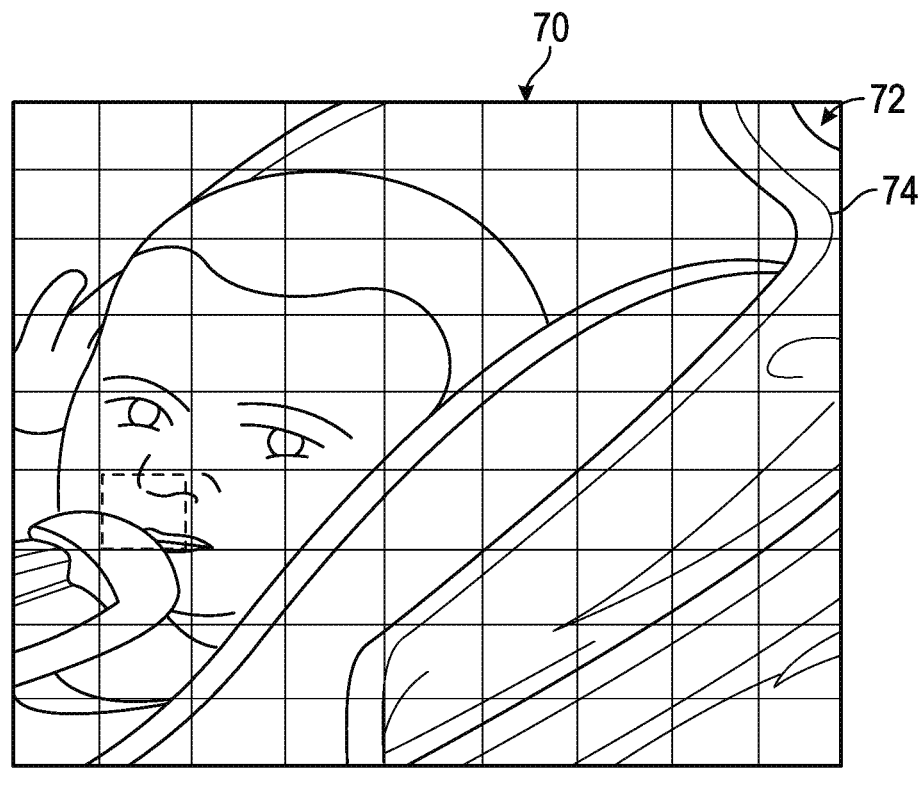
FIG. 3 is a schematic view of an input image.
FIG. 4 is a schematic view of a template image.

With reference to FIGS. 2, 3, and 4, the method 100 of region-based cache eviction begins at block 102. At block 102, a recent image captured by the camera 50 is cached in the camera non-transitory computer readable storage device or media 56 as a template image 76. The vehicle non-transitory computer readable storage device or media 46 also stores the template image 76. The template image 76 stored in the vehicle non-transitory computer readable storage device or media 46 and the template image 76 stored in the camera non-transitory computer readable storage device or media 56 are synchronized at predetermined time intervals (e.g., every 1 second). The template image 76 is virtually divided using a template grid 78. Likewise, an input image 70 captured by the camera 50 is virtually divided using an input grid 72. In the present disclosure, the term "grid" means a framework of crisscrossed parallel bars. The input grid 72 divides the input image 70 as into input grid areas 74. The template grid 78 divides the template image 76 as into template grid areas 80. that have the same size. Because the template grid 78 and the input grid 72 have the same size and configuration, the template image 76 has template grid areas 80 that correspond in size and location to the input grid areas 74 of the input image 70. At block 102, for each input grid area 74 of the input image 70, the camera controller 54 executes template matching to compare an input grid area 74 of the input image 70 with a corresponding template grid area 80 of the template image 76. In the present disclosure, the term "template matching" is a technique in digital image processing for finding small parts of an image which match a template image. Before template matching each input grid area 74 of the input image 70 with each corresponding template grid area 80 of the template image 76, the camera controller 54 has already received the input image 72 from the camera 50 and retrieved the template image 76 from the camera non-transitory computer readable storage device or media 56. The template matching process generates an matching error for each input grid area 74. The matching error is indicative of the difference between the input grid area 74 and the corresponding template grid area 80. After executing template matching, the method 100 continues to block 104.

At block 104, the matching error of an adjacent-input grid area 74 (i.e., an input grid area 74 directly adjacent to the target input area 74) is weighted to distinguish between static scenes and dynamic scenes in the input image 70. To do so, the camera controller 54 may use the following equation:

$$\epsilon_{adj} = \sum_{i=-1}^{1}\sum_{j=-1}^{1} w_{i,j}\epsilon_{ij} \qquad \text{Eq. 1}$$

where:

$\epsilon_{adj}$ is an matching error of the adjacent-input grid area 74;
i is an input grid area 74;
j is a template grid area 80;
$\omega_{i,j}$ is an error weight of the target input grid area 74; and
$\epsilon_{ij}$ is the matching error of the target input grid area 74.
If too many input grid areas 74 have a large matching error or matching error (i.e., the matching error is greater than a threshold), then the camera controller 54 reverts back to regular steaming service. After block 104, the method 100 continues to block 106.

At block 106, the camera controller 54 executes a threshold-based grid area filtering. To do so, for each input grid area 74, the camera controller 54 compares matching error of the target input grid area 74 with a template-matching error threshold to determine whether the matching error is equal to or greater than the template-matching error threshold in order to identify unmatched grid areas of the input image 70. The input grid areas 74 includes the unmatched grid areas and matched grid areas. The matching error of the unmatched grid areas is equal to or greater than the template-matching error threshold. The matching error of the matched grid areas is not equal to or greater than the template-matching error threshold. The camera controller 54 then filters out the unmatched grid areas. Then, the method 100 continues to block 108.

At block 108, the camera controller 54 determines the matching error of the adjacent-input grid area 74 satisfies a condition defined by the following equation:

$$\theta_{tm} \le \epsilon_{adj} \le \theta_c \qquad \text{Eq. 2}$$

where:

$\epsilon_{adj}$ is the matching error of the adjacent-input grid area 74;
$\theta_{tm}$ is the template-matching error threshold; and
$\theta_c$ is the cache error threshold.

If the matching error of the adjacent-input grid area 74 does not satisfy the condition defined by equation 2, then the method 100 continues to block 110. At block 110, no cache update is performed. In other words, the camera controller 54 refrains from caching the target input grid area 74 If the matching error of the adjacent-input grid area 74 satisfies the condition defined by equation 2, then the method 100 continues to block 112. At block 112, the adjacent-input grid area 74 is cached as part of the template image 76. In other words, the target input grid area is cached as part of the template image in response to determining: (a) that the matching error is equal to or greater than the template-matching error threshold and (b) that the matching error is equal to or less than the cache error threshold. Then, the method 100 continues to block 114.

At block 114, the camera controller 54 performs an overlap test across the cached input grid regions 74 to determine whether the input grid area 74 added to the template image 76 overlaps with a template grid 80 previously saved as part of the template image 76. Then, the method 100 continues to block 116.

At block 116, the camera controller 54 determines whether the input grid area 74 added to the template image 76 overlaps with a template grid 80 previously saved as part of the template image 76. If the input grid area 74 added to the template image 76 overlaps with a template grid 80 previously saved as part of the template image 76, then the method 100 continues to block 118.

At block 118, the camera controller 54 deletes (i.e., evicts) the template grid 80 previously saved as part of the template image 76. If the input grid area 74 added to the template image 76 does not overlap with a template grid 80 previously saved as part of the template image 76, then the method 100 continues to block 120. An auxiliary age-based cache eviction policy may also be used.

At block 120, the camera controller 54 commands the transmitter 58 to wirelessly transmit the unmatched grid areas of the input image 70 to the vehicle 10 and transmit identification information of the matched grid areas to the vehicle 10, thereby minimizing bandwidth consumption during video streaming. As discussed above, the matching error of the unmatched grid areas is equal to or greater than the template-matching error threshold, and the matching error of the matched grid areas is not equal to or greater than the template-matching error threshold. As discussed above, the template image 76 stored in the vehicle non-transitory computer readable storage device or media 46 and the template image 76 stored in the camera non-transitory computer readable storage device or media 56 are synchronized at predetermined time intervals (e.g., every 1 second). The identification information provides the location of the template grid areas 82 of the template image 76 stored in the vehicle non-transitory computer readable storage device or media 46 that correspond to the unmatched grid areas. The vehicle controller 34 then commands the display 48 to present a final image, which corresponds to the input image 70 solely using the unmatched grid areas received from the camera 50 and the matched grid areas retrieved from the template image 76 stored in the vehicle non-transitory computer readable storage device or media 46. Accordingly, the camera 50 refrains from transmitting the matched grid areas of the input image 70 and solely transmits the unmatched grid areas of the input image 70 and the identification information corresponding to the matched grid areas of the input image 70, thereby minimizing bandwidth consumption during video streaming. Then, the method 100 ends.

Figure 5:
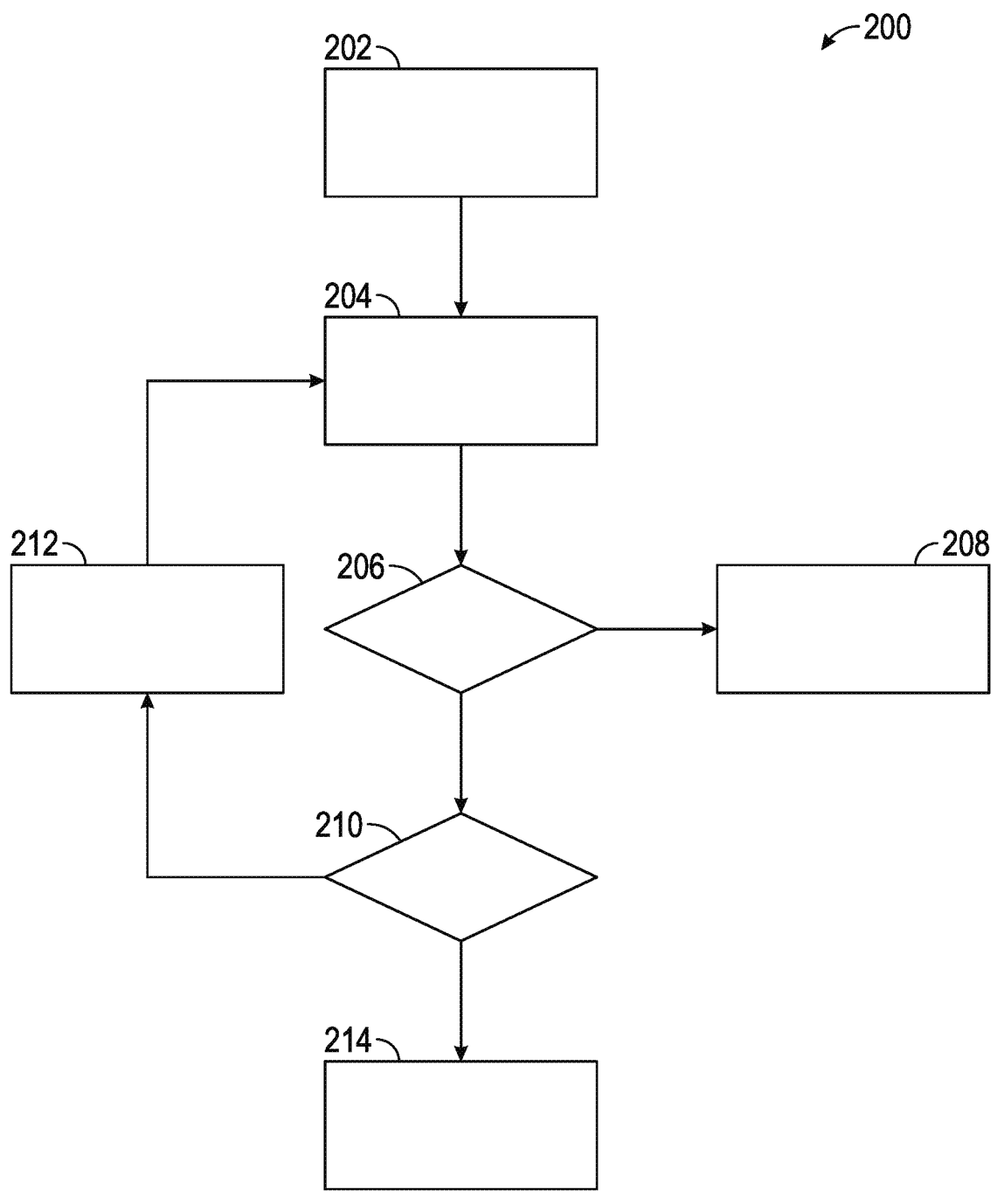
FIG. 5 is a flowchart of method for localized template searching.

FIG. 5 is a flowchart of a method 200 for localized template searching. The method 200 begins at block 202. At block 202, the camera controller 34 receives the input image 70 captured by the camera 50. As discussed above, the input image 70 captured by the camera 50 is virtually divided into input grid areas 74 by the input grid 72. The method 200 then proceeds to block 204.

At block 204, the camera controller 54 performs template matching between the input image 70 and the template image 76 as discussed above with respect to FIG. 2. As discussed above, template matching generates an matching error. Then, the method 200 continues to block 206.

At block 206, the camera controller 54 determines whether the target input grid area 74 of the input image 70 matches a corresponding template grid area 80 of the template image 76 based on the matching error as discussed above with respect to FIG. 2. If the target input grid area 74 of the input image 70 does not match the corresponding template grid area 80 of the template image 76, the method 200 continues to block 208. At block 208, the camera controller 54 identifies a subsequent input grid area 74 of the input image 70 to be template matched with a corresponding, subsequent template grid area 80 of the template image 76 using a predetermined candidate grid selection policy. As a non-limiting example, the predetermined candidate grid selection policy may be to randomly select the subsequent input grid area 74 of the input image 70 to be template matched with a corresponding, subsequent template grid area 80 of the template image 76. Then, the method 200 returns to block 204.

If, at block 206, the target input grid area 74 of the input image 70 matches the corresponding template grid area 80 of the template image 76, the method 200 continues to block 208, then the method 200 continues to block 210. At block 210, the camera controller 54 determines whether all the input grid areas 74 of the input image 70 have matched corresponding template grid areas 80 of the template image 76. If all the input grid areas 74 of the input image 70 have matched corresponding template grid areas 80 of the template image 76, then the method 200 continues to block 214. At block 214, the method 200 ends.

At block 210, if not all the input grid areas 74 of the input image 70 have matched corresponding template grid areas 80 of the template image 76, then the method 200 continues to block 212. At block 212, the camera controller 54 executes a breath-first search (BFS) to identify a subsequent input grid area 74 of the input image 70 to be template matched with a corresponding, subsequent template grid area 80 of the template image 76. Then, the method 200 returns to block 204.

Figure 6:
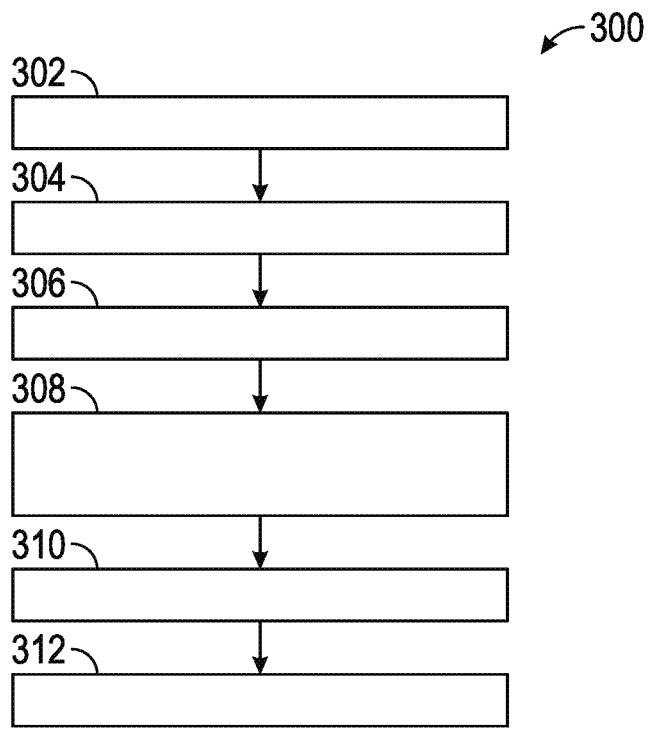
FIG. 6 is a flowchart of method for localized template searching in accordance with another embodiment of the present disclosure.
Figure 7:
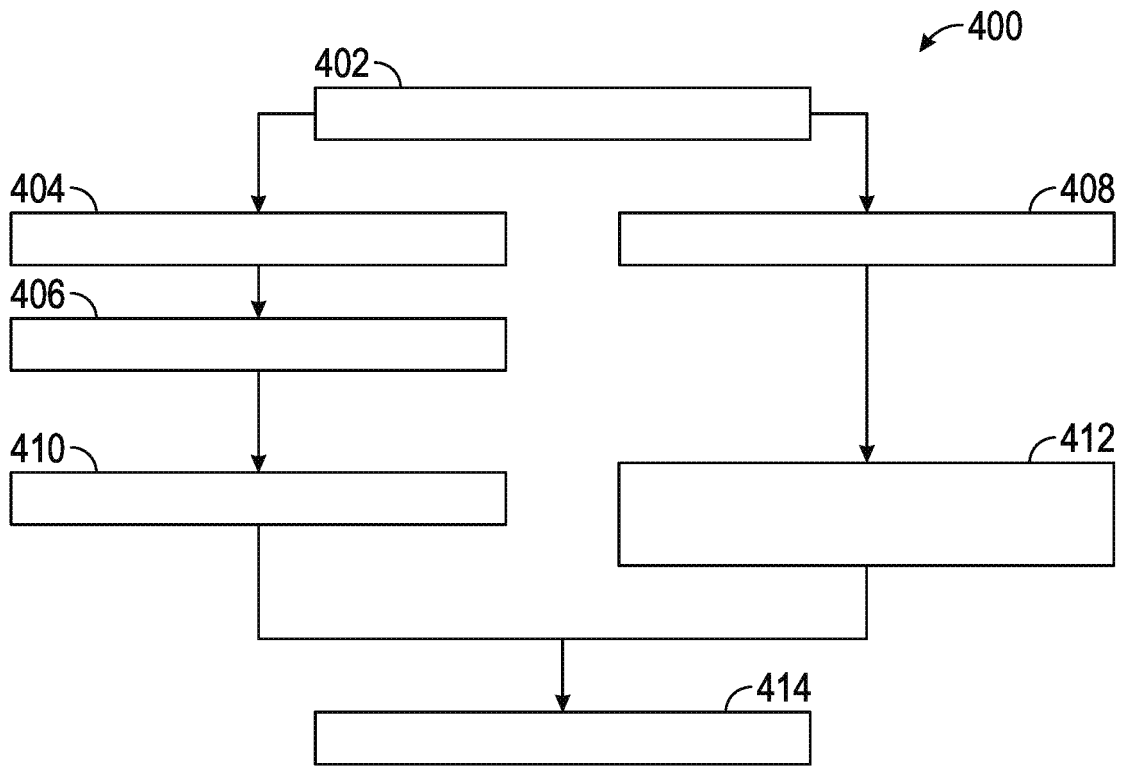
FIG. 7 is a flowchart of a method for video streaming using a hardware encoder.

FIG. 6 is a flowchart of a method 300 for localized template searching in an accordance with another embodiment of the present disclosure. The method 300 begins at block 302. At block 302, the camera controller 54 receives the raw frame video. Then, the method 300 continues to block 304. At block 304, the raw video image is encoded using the video encoder 60 of the camera 50. As discussed above, the video encoder 60 is a hardware encoder. Then, the method 300 continues to block 306. At block 306, the camera controller 54 extracts a motion vector generated by video decoder 60 to later identify a subsequent input grid area 74 of the input image to be template matched with a corresponding, subsequent template grid area 80 of the template image 76. Then, the method 300 continues to block 308. At block 308, the camera controller 54 executes template matching using the motion vector as guidance for identifying a subsequent input grid area 74 of the input image to be template matched with a corresponding, subsequent template grid area 80 of the template image 76. Then, the method 300 continues to block 310. At block 310, the camera controller 54 performs a matching error arbitration, as discussed above with respect to the method 100, to identify unmatched input grid areas 74 and matched input grid areas 74. Then, the method 300 continues to block 312. At block 312, the camera controller 54 performs the downstream processing at discussed above with respect to block 120 of the method 100.

FIG. 7 is a flowchart of a method 400 for method 400 for video streaming using the video encoder 60, which is a hardware encoder. The method 400 begins at block 402. At block 402, the camera controller 54 receives the raw video frame. Then, the method 400 proceeds to block 404. At block 404, the camera controller 54 performs a grid-based template matching as discussed above with respect to FIG. 1. Then, the method 400 continues to block 406. At block 406, the camera controller 54 evaluates the input grid areas 74 with a high matching errors. The method 400 further includes block 408. At block 408, the raw video frames are encoded with the video encoder, which is a hardware encoder. Blocks 404 and 406 may be performed at the same time as the execution of block 408. After block 406, the method 400 continues to block 410. At block 410, the camera controller 54 performs the mask generation process to identify the unmatched grid areas and matched grid areas of the input image 70. The method 400 also includes block 412. At block 412, the camera controller 54 extracts the unmatched grid areas and the originally encoded grid areas of the input image 70. Then, the method 400 continues to block 414. At block 414, the video content is delivered to the vehicle 10.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for video streaming, comprising:
receiving an input image from a camera, wherein the input image includes a plurality of input grid areas, and the camera is in wireless communication with a vehicle;
receiving a template image, wherein the template image includes a plurality of template grid areas;

template matching each of the plurality of input grid areas of the input image to each corresponding one of the plurality of template grid areas of the template image to generate a matching error;
comparing the matching error with a template-matching error threshold to determine whether the matching error is equal to or greater than the template-matching error threshold in order to identify unmatched grid areas of the input image, wherein the plurality of input grid areas includes the unmatched grid areas and matched grid areas, the matching error of the unmatched grid areas is equal to or greater than the template-matching error threshold, and the matching error of the matched grid areas is not equal to or greater than the template-matching error threshold;
in response to determining that the matching error is equal to or greater than the template-matching error threshold, transmitting the unmatched grid areas of the input image and identification information of the matched grid areas to the vehicle, thereby minimizing bandwidth consumption during video streaming;
comparing the matching error with a cache error threshold to determine whether the matching error is less than or equal to the cache error threshold; and
in response to determining: (a) that the matching error is equal to or greater than the template-matching error threshold and (b) that the matching error is equal to or less than the cache error threshold, caching a target input grid area as part of the template image.

2. The method of claim 1, further comprising, in response to determining: (a) that the matching error is not equal to or greater than the template-matching error threshold and (b) that the matching error is not equal to or less than the cache error threshold, refraining from caching a target input grid area as part of the template image.

3. The method of claim 1, further comprising, in response to determining that the matching error is equal to or greater than the template-matching error threshold, executing a breath-first search (BFS) to identify a subsequent input grid area of the plurality of input grid areas of the input image to be template matched with a corresponding, subsequent template grid area of the plurality of template grid areas of the template image in order to avoid unnecessarily template matching trials.

4. The method of claim 3, wherein the matching error of an adjacent-input grid area is weighted to distinguish between static scenes and dynamic scenes in the input image, and the adjacent-input grid area is directly adjacent to the target input grid area.

5. The method of claim 1, further comprising, in response to determining that the matching error is equal to or greater than the template-matching error threshold, extracting a motion vector generated by a hardware encoder to identify a subsequent input grid area of the plurality of input grid areas of the input image to be template matched with a corresponding, subsequent template grid area of the plurality of template grid areas of the template image.

6. The method of claim 1, further comprising encoding, by a hardware encoder of the camera, the unmatched grid areas of the input image, and the method further comprising showing a final image in a display of the vehicle solely using the unmatched grid areas of the input image wirelessly transmitted from a wireless camera and the matched grid areas of the template image retrieved from a tangible, non-transitory, machine-readable medium of the vehicle.

7. A tangible, non-transitory, machine-readable medium, comprising machine-readable instructions, that when executed by a processor, cause the processor to:

receive an input image from a camera, wherein the input image includes a plurality of input grid areas, and the camera is in wireless communication with a vehicle;

receive a template image, wherein the template image includes a plurality of template grid areas;

template match each of the plurality of input grid areas of the input image to each corresponding one of the plurality of template grid areas of the template image to generate an matching error;

compare the matching error with a template-matching error threshold to determine whether the matching error is equal to or greater than the template-matching error threshold in order to identify unmatched grid areas of the input image, wherein the plurality of input grid areas includes the unmatched grid areas and matched grid areas, the matching error of the unmatched grid areas is equal to or greater than the template-matching error threshold, and the matching error of the matched grid areas is not equal to or greater than the template-matching error threshold;

in response to determining that the matching error is equal to or greater than the template-matching error threshold, command a transmitter to transmit the unmatched grid areas of the input image and identification information of the matched grid areas to the vehicle, thereby minimizing bandwidth consumption used during video streaming;

compare the matching error with a cache error threshold to determine whether the matching error is less than or equal to the cache error threshold; and in response to determining: (a) that the matching error is equal to or greater than the template-matching error threshold and (b) that the matching error is equal to or less than the cache error threshold, cache a target input grid area as part of the template image.

8. The tangible, non-transitory, machine-readable medium of claim 7, wherein the tangible, non-transitory, machine-readable medium, further comprising machine-readable instructions, that when executed by the processor, causes the processor to:

in response to determining: (a) that the matching error is not equal to or greater than the template-matching error threshold and (b) that the matching error is not equal to or less than the cache error threshold, refrain from caching a target input grid area as part of the template image.

9. The tangible, non-transitory, machine-readable medium of claim 7, wherein the tangible, non-transitory, machine-readable medium, further comprising machine-readable instructions, that when executed by the processor, causes the processor to:

in response to determining that the matching error is equal to or greater than the template-matching error threshold, execute a breath-first search (BFS) to identify a subsequent input grid area of the plurality of input grid areas of the input image to be template matched with a corresponding, subsequent template grid area of the plurality of template grid areas of the template image.

10. The tangible, non-transitory, machine-readable medium of claim 9, wherein the matching error of an adjacent-input grid area is weighted to distinguish between static scenes and dynamic scenes in the input image, and the adjacent-input grid area is directly adjacent to the target input grid area.

11. The tangible, non-transitory, machine-readable medium of claim 7, wherein the tangible, non-transitory, machine-readable medium, further comprising machine-readable instructions, that when executed by the processor, causes the processor to:

in response to determining that the matching error is equal to or greater than the template-matching error threshold, extract a motion vector generated by a video encoder to identify a subsequent input grid area of the plurality of input grid areas of the input image to be template matched with a corresponding, subsequent template grid area of the plurality of template grid areas of the template image.

12. The tangible, non-transitory, machine-readable medium of claim 7, wherein the tangible, non-transitory, machine-readable medium, further comprising machine-readable instructions, that when executed by the processor, causes the processor to:

command a hardware encoder of the camera to encode the unmatched grid areas of the input image.

13. A system, comprising:

a transmitter;

a controller in communication with the transmitter, wherein the controller is programmed to:

receive an input image from a camera, wherein the input image includes a plurality of input grid areas, and the camera is in wireless communication with a vehicle;

receive a template image, wherein the template image includes a plurality of template grid areas;

template match each of the plurality of input grid areas of the input image to each corresponding one of the plurality of template grid areas of the template image to generate a matching error;

compare the matching error with a template-matching error threshold to determine whether the matching error is equal to or greater than the template-matching error threshold in order to identify unmatched grid areas of the input image, wherein the plurality of input grid areas includes the unmatched grid areas and matched grid areas, the matching error of the unmatched grid areas is equal to or greater than the template-matching error threshold, and the matching error of the matched grid areas is not equal to or greater than the template-matching error threshold;

in response to determining that the matching error is equal to or greater than the template-matching error threshold, command the transmitter to transmit the unmatched grid areas of the input image and identification information of the matched grid areas to the vehicle, thereby minimizing bandwidth consumption used during video streaming;

compare the matching error with a cache error threshold to determine whether the matching error is less than or equal to the cache error threshold; and in response to determining: (a) that the matching error is equal to or greater than the template-matching error threshold and (b) that the matching error is equal to or less than the cache error threshold, cache a target input grid area as part of the template image.

14. The system of claim 13, wherein the controller is programmed to:

in response to determining: (a) that the matching error is not equal to or greater than the template-matching error threshold and (b) that the matching error is not equal to or less than the cache error threshold, refraining from caching a target input grid area as part of the template image.

15. The system of claim 13, wherein the controller is programmed to:

in response to determining that the matching error is equal to or greater than the template-matching error threshold, execute a breath-first search (BFS) to identify a subsequent input grid area of the plurality of input grid areas of the input image to be template matched with a corresponding, subsequent template grid area of the plurality of template grid areas of the template image.

16. The system of claim 15, further comprising a hardware encoder in communication with the controller, wherein the controller is programmed to:

in response to determining that the matching error is equal to or greater than the template-matching error threshold, extract a motion vector generated by the hardware encoder to identify a subsequent input grid area of the plurality of input grid areas of the input image to be template matched with a corresponding, subsequent template grid area of the plurality of template grid areas of the template image.

17. The system of claim 13, wherein the matching error of an adjacent-input grid area is weighted to distinguish between static scenes and dynamic scenes in the input image, and the adjacent-input grid area is directly adjacent to the target input grid area.

* * * * *